United States Patent
Wang et al.

(10) Patent No.: US 10,884,473 B2
(45) Date of Patent: Jan. 5, 2021

(54) METHODS, ELECTRONIC DEVICES, AND STORAGE MEDIUMS FOR WAKING UP AN ICON

(71) Applicant: BEIJING XIAOMI MOBILE SOFTWARE CO., LTD., Beijing (CN)

(72) Inventors: Gang Wang, Beijing (CN); Ju Tang, Beijing (CN); Di Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 169 days.

(21) Appl. No.: 16/379,134

(22) Filed: Apr. 9, 2019

(65) Prior Publication Data

US 2019/0369695 A1    Dec. 5, 2019

(30) Foreign Application Priority Data

May 30, 2018  (CN) .......................... 2018 1 0541835

(51) Int. Cl.
*G06F 1/00* (2006.01)
*G06F 1/3206* (2019.01)
*G06F 3/0481* (2013.01)
*G06K 9/00* (2006.01)

(52) U.S. Cl.
CPC ........ *G06F 1/3206* (2013.01); *G06F 3/04817* (2013.01); *G06K 9/0002* (2013.01); *G06K 9/00087* (2013.01)

(58) Field of Classification Search
CPC .... G06F 1/3206; G06F 3/04817; G06F 21/32; G06F 3/0488; G06F 3/04883;
(Continued)

(56) References Cited

U.S. PATENT DOCUMENTS

2013/0326395 A1*  12/2013  Oh .................. G06F 3/0488
                                                          715/781
2014/0040821 A1*  2/2014  Carlsson ........... G06F 3/04883
                                                          715/800
(Continued)

FOREIGN PATENT DOCUMENTS

CN        104932824 A       9/2015
CN        106484483 A       3/2017
(Continued)

OTHER PUBLICATIONS

First Chinese Office Action issued in Chinese Application No. 201810541835.6 dated Aug. 28, 2020 with English translation, (2p).
(Continued)

*Primary Examiner* — Xuxing Chen
(74) *Attorney, Agent, or Firm* — Arch & Lake LLP

(57) ABSTRACT

A method and a terminal device are provided for waking up an icon. Upon detection of a first wake event while a display screen of said terminal device is in a Screen-Off mode, the terminal device determines whether a second wake event is detected within a preset time threshold. The display screen is equipped with an under-screen fingerprint recognition circuitry in a fingerprint recognition area. Upon detection of said second wake event within said preset time threshold, the terminal device causes said display screen to switch into a Screen-On mode in which a preset icon is displayed in the fingerprint recognition area. When said second wake event is not detected within said preset time threshold, the said terminal device causes said display screen to switch into an Always on Display mode in which said preset icon is displayed in the fingerprint recognition area.

20 Claims, 14 Drawing Sheets

(58) Field of Classification Search
CPC .. G06F 9/451; G06K 9/0002; G06K 9/00087; G06K 9/0004; G06K 9/00912
See application file for complete search history.

(56) References Cited

U.S. PATENT DOCUMENTS

| | | | |
|---|---|---|---|
| 2015/0091802 A1* | 4/2015 | Shih | G06F 3/0416 345/163 |
| 2017/0075545 A1* | 3/2017 | Kim | G06F 3/04842 |
| 2018/0075273 A1* | 3/2018 | Vissa | G06K 9/22 |
| 2018/0164974 A1* | 6/2018 | Park | G06F 3/0488 |
| 2018/0211090 A1 | 7/2018 | Yang | |
| 2018/0349669 A1* | 12/2018 | Kim | G06K 9/22 |
| 2020/0125229 A1* | 4/2020 | Xu | G06F 1/3265 |

FOREIGN PATENT DOCUMENTS

| | | |
|---|---|---|
| CN | 106485124 A | 3/2017 |
| CN | 106570372 A | 4/2017 |
| CN | 107077554 A | 8/2017 |
| CN | 107422976 A | 12/2017 |
| CN | 107656665 A | 2/2018 |
| EP | 3299947 A1 | 3/2018 |

OTHER PUBLICATIONS

European Patent Office, Extended European Search Report Issued in Application No. 19174132.1, dated Oct. 30, 2019, Germany, (8p).

* cited by examiner

METHODS, ELECTRONIC DEVICES, AND STORAGE MEDIUMS FOR WAKING UP AN ICON

CROSS-REFERENCE TO RELATED APPLICATIONS

This application is based on and claims priority from Chinese Patent Application No. 201810541835.6, filed on May 30, 2018, the entire contents of which are incorporated herein by reference.

TECHNICAL FIELD

The present disclosure relates to the field of screen wake technology, and more particularly to an icon wake method, an electronic device, and a storage medium in Screen-Off mode.

BACKGROUND

With the continuous development of fingerprint recognition technology, the fingerprint recognition method of electronic products has also been developed continuously—gradually developed from the previous scratch-type fingerprint recognition and push-type fingerprint recognition (such as capacitive fingerprint recognition) to the under-screen fingerprint recognition method, further enhancing the appearance of electronic products and reducing external parts of electronic products.

When the under-screen fingerprint recognition method is applied, as the fingerprint recognition areas are usually set in the screen, in the Screen-Off mode in which the entire screen is not lit at all and no pixel is displayed, it is difficult for the user to determine the position of the fingerprint recognition area, which causes certain difficulties in the collection of fingerprint information.

SUMMARY

According to a first aspect of the present disclosure, an icon wake method is provided, which is applied to terminal device, the method comprising: upon detection of a first wake event while a display screen of said terminal device is in a Screen-Off mode, determining, by said terminal device, whether a second wake event is detected within a preset time threshold, wherein said display screen is equipped with an under-screen fingerprint recognition circuitry in a fingerprint recognition area; upon detection of said second wake event within said preset time threshold, causing, by said terminal device, said display screen to switch into a Screen-On mode in which a preset icon is displayed in the fingerprint recognition area; and when said second wake event is not detected within said preset time threshold, causing, by said terminal device, said display screen to switch into an Always on Display mode in which said preset icon is displayed in the fingerprint recognition area.

According to a second aspect of the present disclosure, an electronic device is provided, comprising: a processor; a storage storing executable instructions for said processor; a display screen, in which a fingerprint recognition area being equipped with an under-screen fingerprint recognition circuitry; wherein the processor is configured to: upon detection of a first wake event while said display screen is in a Screen-Off mode, determine whether a second wake event is detected within a preset time threshold; upon detection of said second wake event within said preset time threshold, cause said display screen to switch to a Screen-On mode in which a preset icon is displayed in the fingerprint recognition area; when said second wake event is not detected within said preset time threshold, cause said display screen to switch to an Always on Display mode in which said preset icon is displayed in the fingerprint recognition area; wherein said under-screen fingerprint recognition circuitry is configured to: perform fingerprint recognition in the Screen-On mode or Always on Display mode.

According to a third aspect of the present disclosure, it is provided a non-transitory computer-readable storage medium storing a program for causing a processor to execute the steps of: determining, upon detection of a first wake event while a display screen of a terminal device is in a Screen-Off mode, whether a second wake event is detected within a preset time threshold; causing said display screen to switch to a Screen-On mode in which a preset icon is displayed in a fingerprint recognition area of the display screen, upon detection of said second wake event within said preset time threshold; and causing said display screen to switch to an Always on Display mode in which said preset icon is displayed in the fingerprint recognition area, when said second wake event is not detected within said preset time threshold.

It should be understood that, the general description above and the detailed description later are only illustrative and explanatory, not intended to limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. More particular description of the embodiments will be rendered by reference to specific embodiments illustrated in the appended drawings. Given that these drawings depict only some embodiments and are not therefore considered to be limiting in scope. The embodiments will be described and explained with additional specificity and details through the use of the accompanying drawings, in which.

DETAILED DESCRIPTION OF THE ILLUSTRATED EMBODIMENT

Exemplary embodiments will be described in detail herein, examples of which are illustrated in the accompanying drawings. The following description refers to the accompanying drawings in which the same numbers in different drawings indicate the same or similar elements. The implementations set forth in the following description of the embodiments do not represent all implementations consistent with the present disclosure. Instead, they are merely examples of devices and methods consistent with some aspects of the present disclosure as recited in the appended claims.

The terms used in the present disclosure are for the purpose of describing particular embodiments only, and are not intended to limit the disclosure. The singular form used in the present disclosure and the appended claims, e.g. "a/an", and "the", are intended to include plural form, unless the context clearly indicates otherwise. It should also be understood that the term "and/or" as used herein refers to and encompasses any and all possible combinations of one or more of the associated listed items.

It should be understood that, although the terms "first", "second", "third", etc. may be used in the present disclosure to describe specific information, such information should not be limited to these terms. These terms are only used to distinguish the same type of information from one another. For example, the first information may also be referred to as the second information without departing from the scope of the present disclosure. Similarly, the second information may also be referred to as the first information. Depending on the context, the word "if" as used herein may be interpreted as "in the case of", "when" or "in response to specific situation of".

In under-screen fingerprint recognition, the Screen-Off mode of the display screen can be converted into an AOD (Always on Display) mode with low power consumption and low refresh rate. That is, when the user is not using the device, only a fingerprint icon is displayed in the fingerprint recognition area in the display screen, facilitating the user to identify the location of the fingerprint recognition area. However, since the position of the fingerprint recognition area of the display screen is fixed, if the fingerprint icon is always on in the AOD mode, it is easy to cause the display portion of the fingerprint icon in the display screen to be burnt, damaging the hardware.

Figure 1:
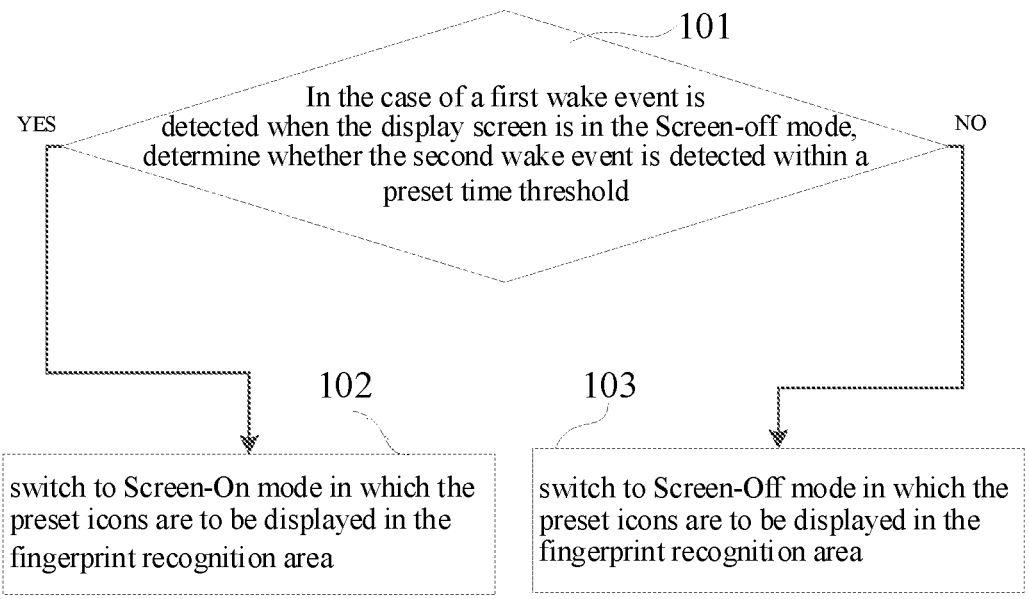
FIG. 1 provides a flowchart of an icon wake method according to an exemplary embodiment of the present disclosure.

In view of the above, the present disclosure provides an icon wake method. As shown in FIG. 1, the method can be used in a terminal device, including the following steps:

In the step of 101, in the case of a first wake event is detected when the display screen of the terminal device is in the Screen-Off mode, determining whether a second wake event is detected within a preset time threshold, wherein the display screen is equipped with an under-screen fingerprint recognition circuitry in a fingerprint recognition area.

Optionally, in the step of 101, the first wake event may include, but not limited to, at least one of a touch wake event, a voice wake event, a location wake event, and a face wake event. The second wake event may include, but not limited to, at least one of a touch wake event, a voice wake event, a location wake event, and a face wake event. The preset time threshold can be a default value preset by the developer during the development phase, or can be preset by the user according to his/her own usage.

Optionally, for both the first wake event and the second wake event, the touch wake event can be detected by a touch detection module of the terminal device, for example, using a capacitive screen to detect a touch wake event; the voice wake event can be detected by a voice module of the terminal device; the location wake event can be detected by a GPS module of the terminal device or other positioning module; and the face wake event can be detected by a face detection module of the terminal device.

Figure 2:
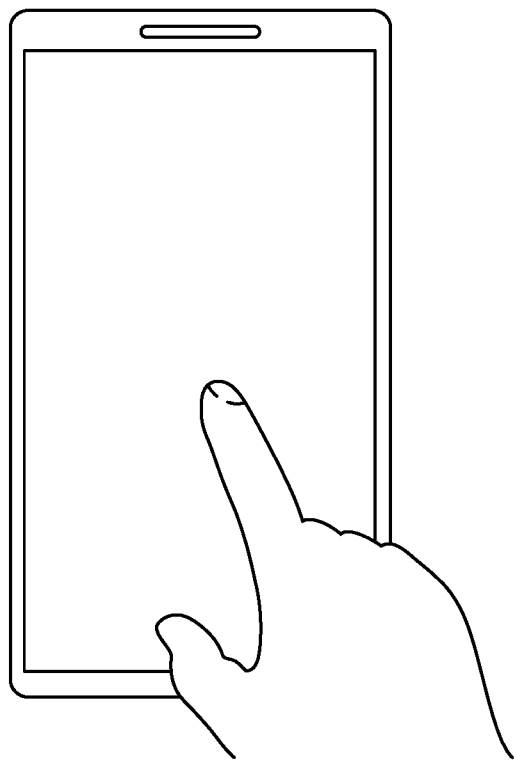
FIG. 2 provides a schematic diagram of the scenario that generates a click event according to an exemplary embodiment of the present disclosure.
Figure 3:
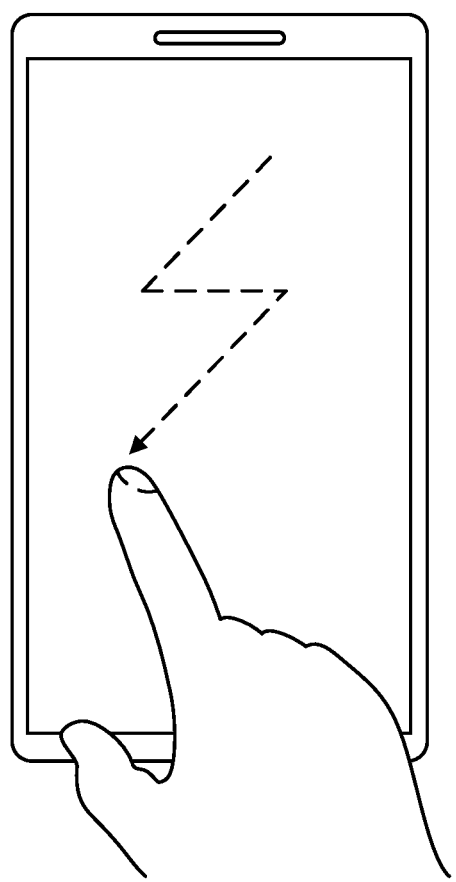
FIG. 3 provides a schematic diagram of the scenario that generates gesture event according to an exemplary embodiment of the present disclosure.

In one embodiment, a touch wake event includes: a click event and a gesture wake event. As shown in FIG. 2, the click event may be generated by a user's finger performing a click operation on the screen. As shown in FIG. 3, the gesture wake event may be generated by the user's finger sliding on the display screen with a track that matches the user's preset sliding wake gesture; for example, if the preset sliding wake gesture is a lightning mark, the user's finger sliding track on the screen needs to be a lightning-shaped trajectory to generate a gesture wake event.

In one embodiment, the voice wake event may be generated after the user issues a voice content that matches the preset voice wake content. For example, the preset voice wake content may be: "wake up", or "stop hibernation", or user-defined content.

In one embodiment, the location wake event may be generated in the following way: the user sets the location information when the icon wake operation needs to be performed in the terminal device, and then the location wake event is generated when the positioning module detects that the current location of the terminal device matches the preset location information (for example, the current location of the terminal device is a location corresponding to the pre-set location information or a location range corresponding to the pre-set location information).

In one embodiment, the face wake event may be generated in the following way: the user registers a face image for triggering a face wake event in the terminal device in advance; and when the user aligns the face with the camera of the terminal device, after the face image captured by the camera is identified and processed by the face detection module of the terminal device and authenticated, a face wake event will be generated.

Figure 4:
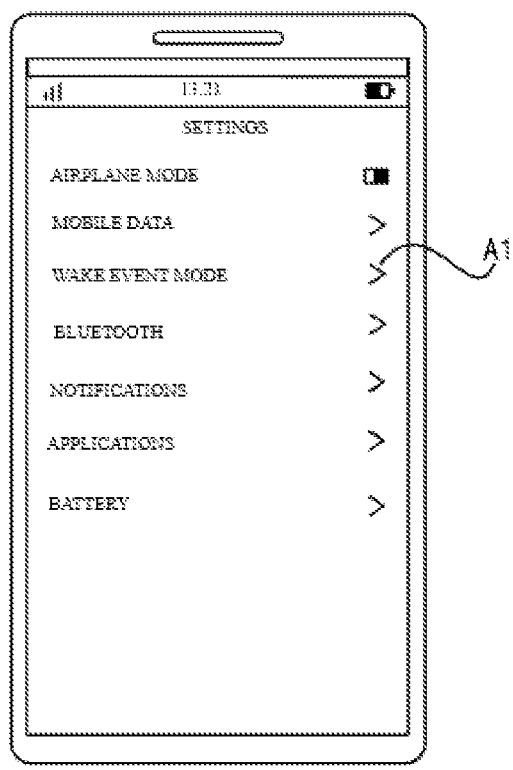
FIG. 4 provides a schematic diagram of a user application interface that is equipped with wake event mode controls according to an exemplary embodiment of the present disclosure.
Figure 5:
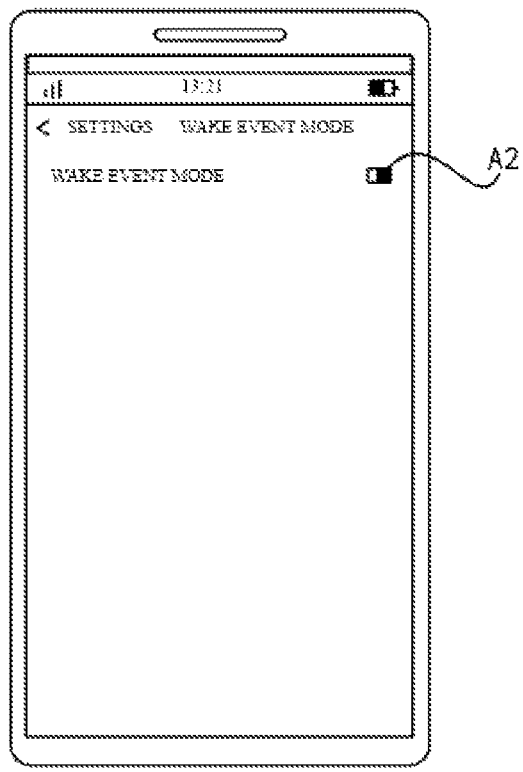
FIG. 5 provides a schematic diagram of a user application interface that is equipped with wake event mode switch controls according to an exemplary embodiment of the present disclosure.
Figure 6:
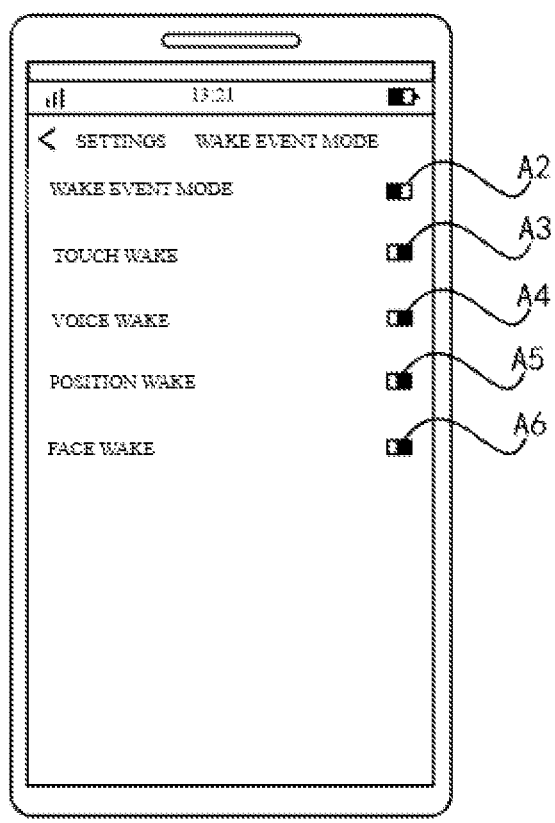
FIG. 6 provides a schematic diagram of a user application interface that is equipped with multiple optional wake methods under wake event mode controls according to an exemplary embodiment of the present disclosure.

In one embodiment, the wake event mode control A1 can be configured in the "Settings" user application interface of the terminal device, as shown in FIG. 4. The switch control A2 for turning on or off the wake event mode can be configured under the wake event mode control A1, as shown in FIG. 5. The touch wake switch control A3, the voice wake switch control A4, the position wake switch control A5, and the face wake switch control A6 can be configured under the switch control A2, as shown in FIG. 6. The click wake switch control A31 and the gesture wake switch control A32 can be configured under the touch wake switch control A3 shown in FIG. 6, as shown in FIG. 7.

In the following, the user operation flow is briefly described by using an example that the user needs to enable the click wake method in the touch wake mode.

Figure 7:
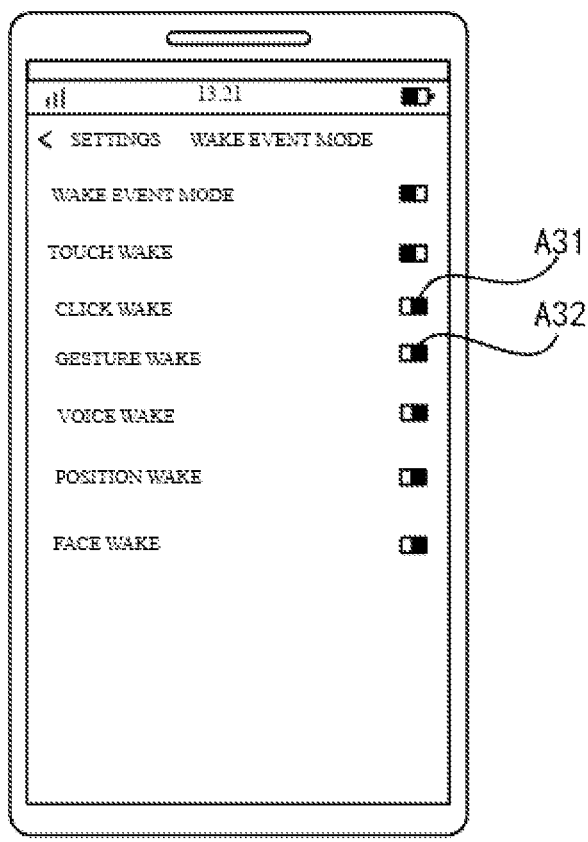
FIG. 7 provides a schematic diagram of a user application interface that is equipped with click wake and gesture wake switch controls under the touch wake controls provided in FIG. 6 according to an exemplary embodiment of the present disclosure.
Figure 8:
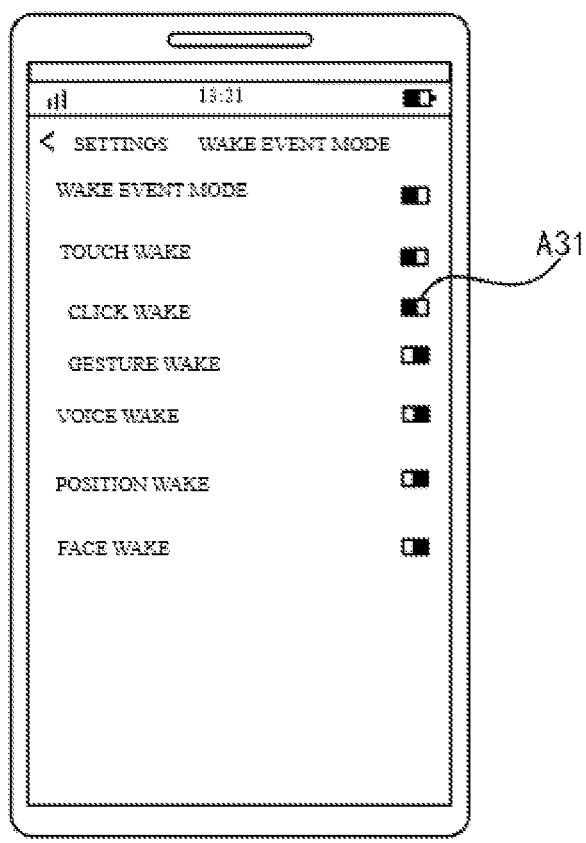
FIG. 8 provides a schematic diagram of a user application interface when click wake method is enabled by a user according to an exemplary embodiment of the present disclosure.

When the user needs to enable the icon wake method of the present disclosure, the user first opens the "Settings" application of the terminal device, and gets to the user interface as shown in FIG. 4; the user then clicks the "Wake event mode" control A1 to switch to the user interface shown in FIG. 5, clicks the "wake event mode" switch control A2 to get to the "wake event mode" switching interface, as shown in FIG. 5, and switches the switch control A2 from the OFF state shown in FIG. 5 to the ON state shown in FIG. 6; the user then clicks the "touch wake" switch control A3 to switch the switch control A3 from the OFF state as shown in FIG. 6 to the ON state as shown in FIG. 7, and clicks "click wake" switch control A31, making the click wake switch control A31 to switch from the OFF state shown in FIG. 7 to the ON state shown in FIG. 8. This will enable the click wake mode.

In the step of 102, if the second wake event is detected within the preset time threshold, causing the display screen to switch to a Screen-On mode in which a preset icon is displayed in the fingerprint recognition area.

Optionally, in the step of 102, when the second wake event is detected within the time threshold, that is, the double wake input is recognized, it indicates that the user currently needs the display to switch to the Screen-On screen mode, so as to be able to clearly see the information displayed in the screen. Screen-On mode means that all pixels in the display are illuminated.

In the step of 103, if the second wake event is not detected within the time threshold, causing the display screen to switch to an Always on Display mode in which the preset icon is displayed in the fingerprint recognition area.

Optionally, in the step of 103, when the second wake event is not detected within the time threshold, that is, the single wake input is recognized, it indicates that the user currently needs the display to switch to the Always on Display mode, so as to be able to reduce consumption of energy to some extent. The Always on Display mode means that all pixels except the preset icon in the display are not illuminated.

Therefore, by switching the screen to the Screen-On display mode or Always on Display mode in which a preset display icon is displayed according to the detected condition of the first wake event and/or the second wake event when the screen of a terminal device is in the Screen-Off mode, the present disclosure enables the quick wake of preset icon in the Screen-Off mode, and facilitates users to perform corresponding operations through icons; and it also facilitates users to select Screen-On display mode that brightens the whole screen or the Always on Display mode that brightens part of the screen according to current demands. In this way, comparing with the method that the AOD mode is used all the time to replace the Screen-Off mode during the period when the device is not in use, it can effectively avoid the occurrence of the burn-in phenomenon caused by displaying the fingerprint icon at a fixed position, prolonging the service life of the related hardware and reducing energy consumption.

In one embodiment, based on the embodiment shown in FIG. 1, the method according to the present disclosure may further include: when the current fingerprint is recognized as a pre-stored security fingerprint by the screen fingerprint recognition circuitry, unlocking the display screen.

In one embodiment, the preset icon in step 102 and step 103 may include: a fingerprint icon and/or an application icon. The application icon can be preset by the user according to the usage requirement, and the number of application icons is not limited.

Figure 9:
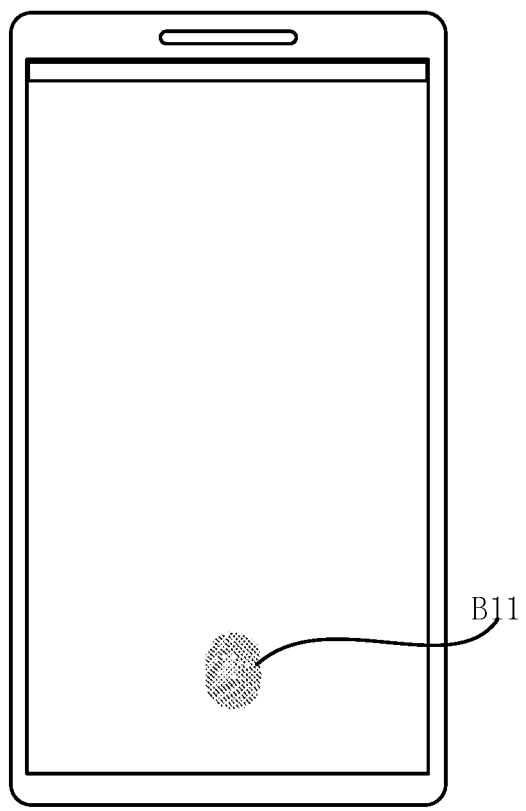
FIG. 9 provides a schematic diagram of a display interface of a screen in Screen-On mode according to an exemplary embodiment of the present disclosure.
Figure 10:
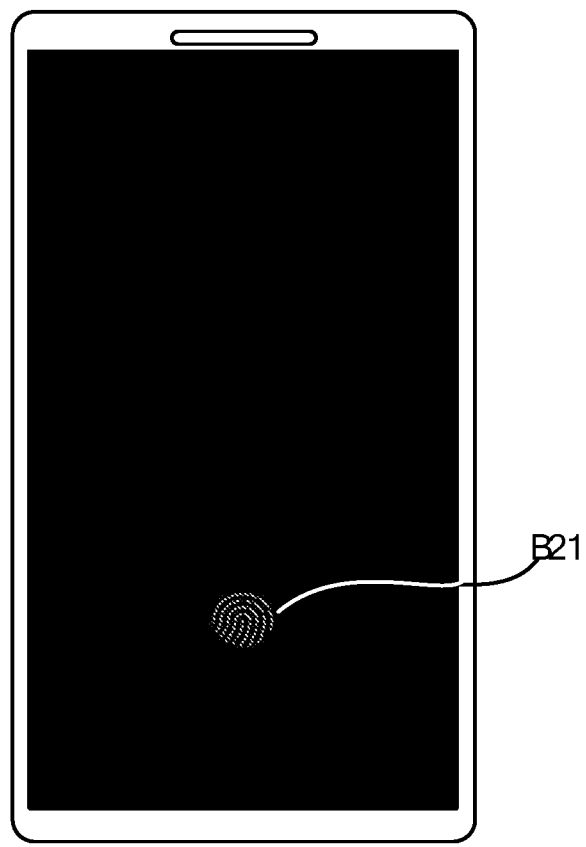
FIG. 10 provides a schematic diagram of a display interface of a screen in Always on Display mode according to an exemplary embodiment of the present disclosure.

In one embodiment, when the preset icon includes only the fingerprint icon, in the Screen-On mode, the display screen displays a fingerprint icon B11 in addition to illuminating all the pixels, as shown in FIG. 9. In the Always on Display mode, only the fingerprint icon B21 is displayed on the screen, and all the pixels except the fingerprint icon are not illuminated, as shown in FIG. 10. Thereby, the user can press the unlocking finger on the fingerprint icons B11, B21, and when the current fingerprint is recognized as a pre-stored security fingerprint by the screen fingerprint recognition circuitry, the display screen will be unlocked.

Figure 11:
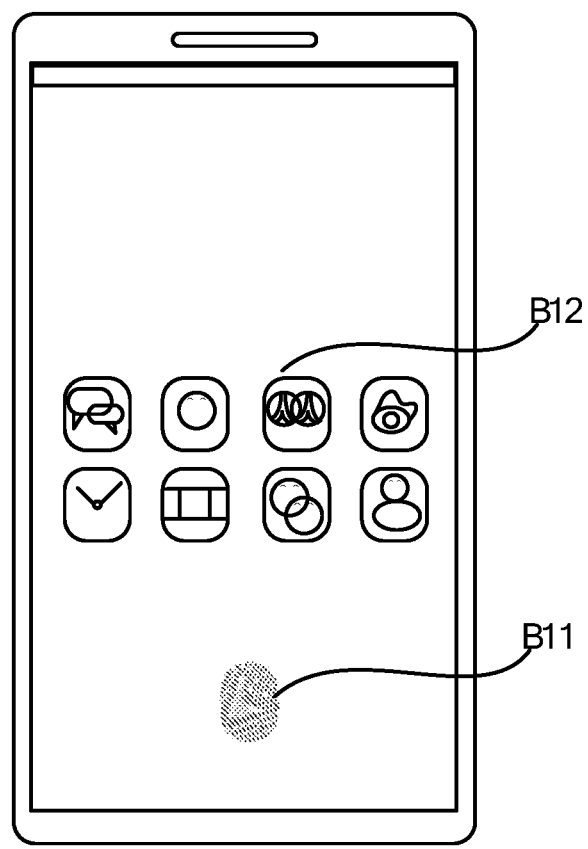
FIG. 11 provides a schematic diagram of a display interface of a screen in Screen-On mode according to an exemplary embodiment of the present disclosure.
Figure 12:
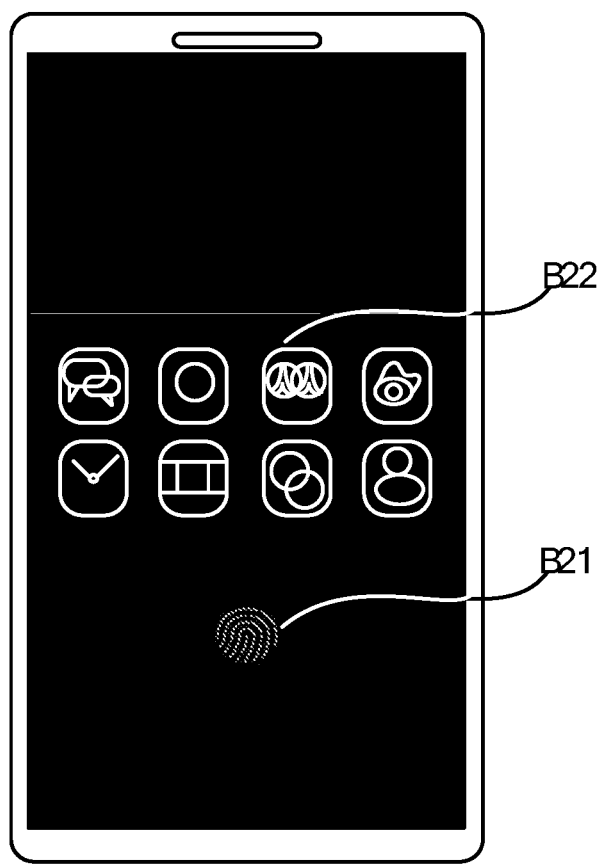
FIG. 12 provides a schematic diagram of a display interface of a screen in Always on Display mode according to an exemplary embodiment of the present disclosure.

In one embodiment, when the preset icons include the fingerprint icon and the application icon, the steps of causing the display screen to switch to the Screen-On mode in which the preset icon is displayed in the fingerprint recognition area, includes: causing the display screen to switch to the Screen-On mode in which a fingerprint icon and an application icon are displayed in the fingerprint recognition area at the same time, or, causing the display screen to switch to the Screen-On mode in which a fingerprint icon is displayed in the fingerprint recognition area and an application icon is displayed outside the fingerprint recognition area. As shown in FIG. 11, a fingerprint icon B11 and a plurality of application icons B12 are simultaneously displayed on the display screen in the Screen-On mode. Besides, the steps of causing the display screen to switch to the Always on Display mode in which the preset icon is displayed in the fingerprint recognition area, includes: causing the display screen to switch to the Always on Display mode in which a fingerprint icon and an application icon are displayed in the fingerprint recognition area at the same time, or, causing the display screen to switch to the Always on Display mode in which a fingerprint icon is displayed in the fingerprint recognition area and an application icon is displayed outside the fingerprint recognition area. As shown in FIG. 12, a fingerprint icon B21 and a plurality of application icons B22 are simultaneously displayed on the display screen in the Always on Display mode.

In one embodiment, based on the embodiments shown in FIG. 11 and FIG. 12, the method in the present disclosure may further include: obtaining a fingerprint at the fingerprint icon area when an application icon is selected; and when the fingerprint at the fingerprint icon area is recognized as a pre-stored security fingerprint by the under-screen fingerprint recognition circuitry, the display screen will be unlocked, and switch into the application interface corresponding to the selected application icon.

This allows the users to quickly access the application they want by first clicking on the desired application icon and then performing unlocking at the fingerprint icon.

In one embodiment, in the Screen-On mode or Always on Mode, when the preset icons include preset application icons, the method in the present disclosure may further include: displaying the fingerprint icon at the fingerprint icon area when the preset application icon is selected; and when the fingerprint at the fingerprint icon area is recognized as a pre-stored security fingerprint by the under-screen fingerprint recognition circuitry, the display screen will be unlocked, and switch into the application interface corresponding to the preset application icon selected.

Figure 13:
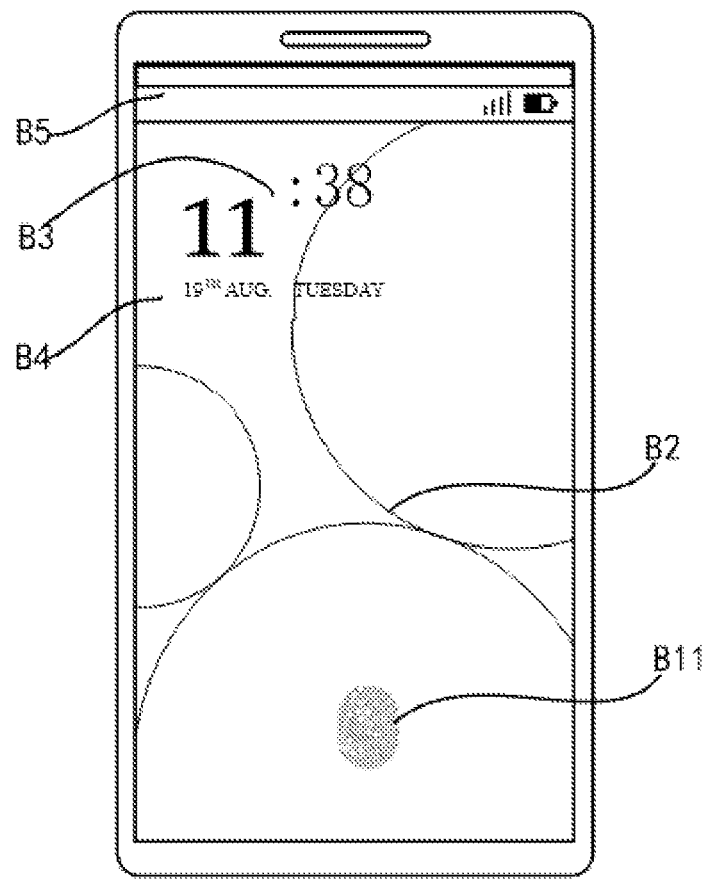
FIG. 13 provides a schematic diagram of a display interface of a screen in Screen-On mode according to an exemplary embodiment of the present disclosure.

In one embodiment, in the Screen-On mode, at least one of the information of screen background, current time, current date, signal bar and information bar may be displayed. As shown in FIG. 13, in addition to displaying the preset icon B11, the screen in the Screen-On mode may also display the display background B2, the current time B3, the current date B4, and the signal bar B5.

In one embodiment, in the Screen-On mode or Always on Mode, when the preset icons include preset application icons, the method in the present disclosure may further include the following step: when the preset application icon is not selected, outputting a selection prompt message.

Optionally, the selection prompt message, which is used to prompt the user to perform a selection operation of the preset application icon, includes but is not limited to at least one of the following messages: a text prompt message, a voice prompt message, and a vibration prompt message.

Therefore, the present disclosure can promptly prevent the user from performing a corresponding operation when the preset application icon is not selected, thereby effectively avoiding the non-response phenomenon caused by the inability to recognize the touch due to the user's touch force being too light.

In one embodiment, after the selection prompt message is output, the method of the present disclosure may further include the following step: when the preset application icon is still not selected within the preset selection time, switching the display screen to the Screen-Off mode.

Optionally, the selection time may be preset by the user, for example, the selection time is set to 5 s.

Optionally, after the selection prompt message is output, when the preset application icon is selected within the preset selection time, a fingerprint icon or a password input field is displayed.

Therefore, when the user needs to stop using the device due to an emergency, the device in the Screen-On mode or the Always on Display mode can be automatically switched to the Screen-Off mode, thereby reducing energy consumption.

Corresponding to the aforementioned embodiment of the icon wake method, the present disclosure also provides one embodiment of the icon wake device.

Figure 14:
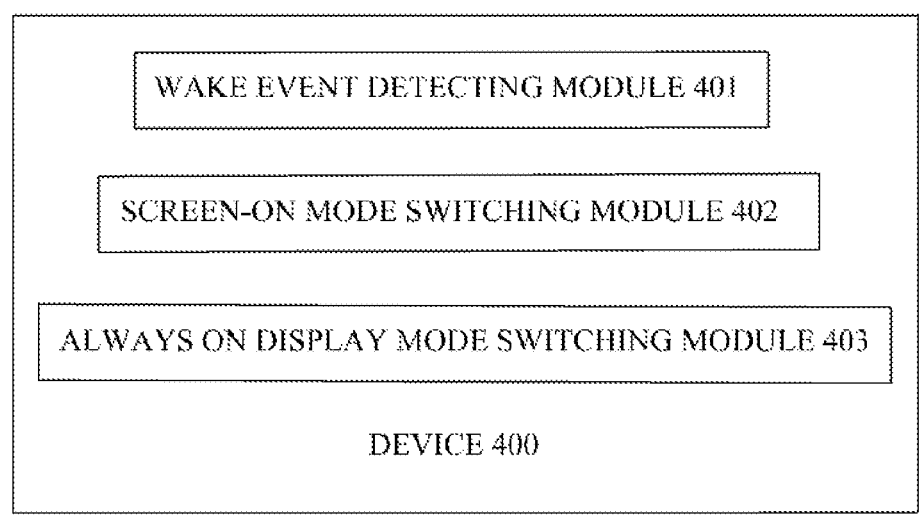
FIG. 14 provides a block diagram of an icon wake device according to an exemplary embodiment of the present disclosure.

As shown in FIG. 14, the present disclosure provides an icon wake device 400 according to an exemplary embodiment, which includes:

a wake event detecting module 401, which is configured to: upon detection of a first wake event while the display screen is in the Screen-Off mode, determine whether a second wake event is detected within a preset time threshold, wherein the display screen is equipped with an under-screen fingerprint recognition circuitry in the fingerprint recognition area;

a Screen-On mode switching module 402, which is configured to: when it is determined that the second wake event is detected within the time threshold, cause the display screen to switch to a Screen-On mode in which the preset icons are to be displayed in the fingerprint recognition area; and an Always on Display mode switching module 403, which is configured to: when it is determined that the second wake event is detected within the time threshold, cause the display screen to switch to an Always on Display mode in which the preset icons are to be displayed in the fingerprint recognition area.

Figure 15:
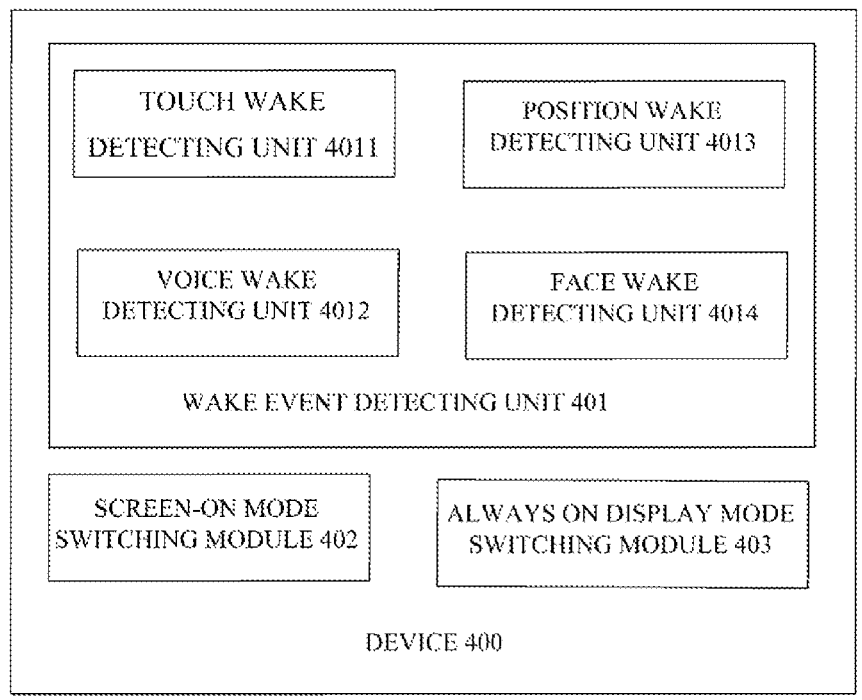
FIG. 15 provides a block diagram of an icon wake device according to an exemplary embodiment of the present disclosure.

As shown in FIG. 15, optionally, the wake event detecting module 401 includes at least one of the following units:

a touch wake detecting unit 4011, which is configured to: detect the touch wake events;

a voice wake detecting unit 4012, which is configured to: detect the voice wake events;

a position wake detecting unit 4013, which is configured to: detect the position wake events; and a face wake detecting unit 4014, which is configured to: detect the face wake events.

In one embodiment, the touch wake detecting unit 4011 is composed of at least one of the following subunit:

a click event detecting subunit, which is configured to: detect click events; and a gesture event detecting subunit, which is configured to: detect gesture wake events.

In one embodiment, the preset icons include: a fingerprint icon and/or an application icon.

In one embodiment, when the screen is in the Screen-On mode, the icon-wake enabled display screen of also displays at least one of the information of screen background, current time, current date, signal bar and information bar.

Since each module and unit in the device of the present disclosure corresponds to the icon wake method described above, the device of the present disclosure can be described according to the aforementioned icon wake method, and thus details are not to be described herein.

Figure 16:
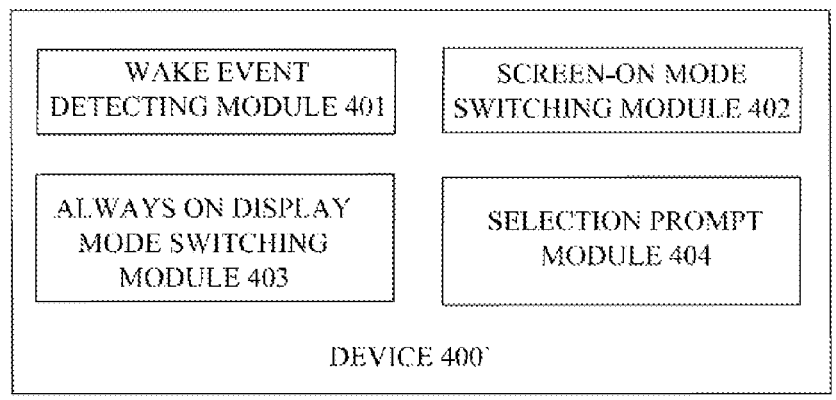
FIG. 16 provides a block diagram of an icon wake device according to an exemplary embodiment of the present disclosure.

As shown in FIG. 16, comparing with the device 400 shown in FIG. 14, according to the icon wake device 400' in another exemplary embodiment, the present disclosure further includes a selection prompt module 404. The selection prompt module 404 is configured to: in the Screen-On mode or Always on Mode, when the icons to be displayed are only the preset application icons and a preset application icon is not selected, the selection prompt message will be output.

For the relationship and function between the selection prompt module 404 and other modules, reference may be made to the icon wake method aforementioned, which will not be described herein.

Figure 17:
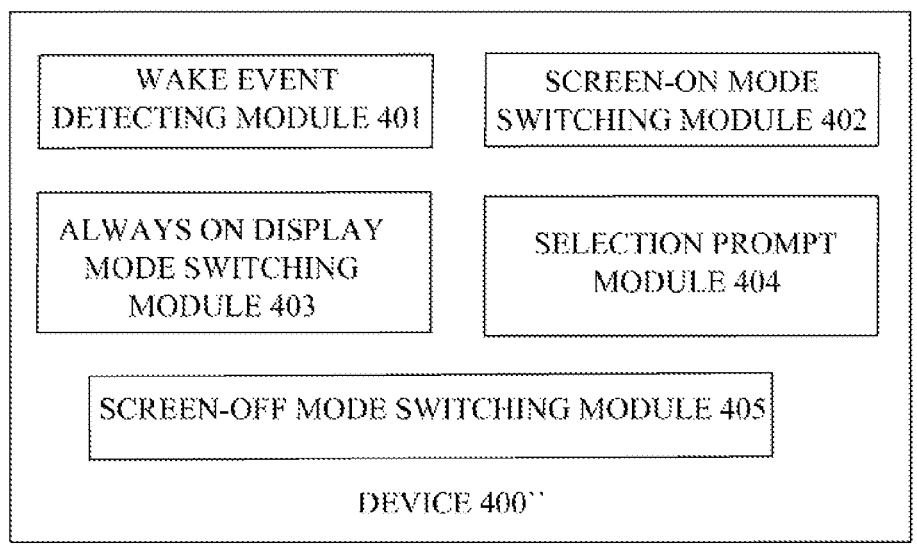
FIG. 17 provides a block diagram of an icon wake device according to an exemplary embodiment of the present disclosure.

As shown in FIG. 17, comparing with the device 400 shown in FIG. 16, according to the icon wake device 400' in another exemplary embodiment, the present disclosure further includes a Screen-Off mode switching module 405. The Screen-Off mode switching module 405 is configured to: when the preset application icon is still not selected within the preset selection time, switch the display screen to the Screen-Off mode.

For the relationship and function between the Screen-Off mode switching module 405 and other modules, reference may be to the icon wake method aforementioned, which will not be described herein.

Corresponding to the aforementioned embodiment of the icon wake method, the present disclosure also provides an electronic device for icon wake. The electronic device includes a processor and a memory for storing processor executable instructions, wherein the processor is configured to: perform the steps of the icon wake method according to the instructions, including:

upon detection of a first wake event while the display screen is in the Screen-Off mode, determining whether a second wake event is detected within a preset time threshold, wherein the display screen is equipped with an under-screen fingerprint recognition module in the fingerprint recognition area;

when the second wake event is detected within the time threshold, causing the display screen to switch to a Screen-On mode in which the preset icon is displayed in the fingerprint recognition area;

when the second wake event is not detected within the time threshold, causing the display screen to switch to an Always on Display mode in which the preset icon is displayed in the fingerprint recognition area.

Figure 18:
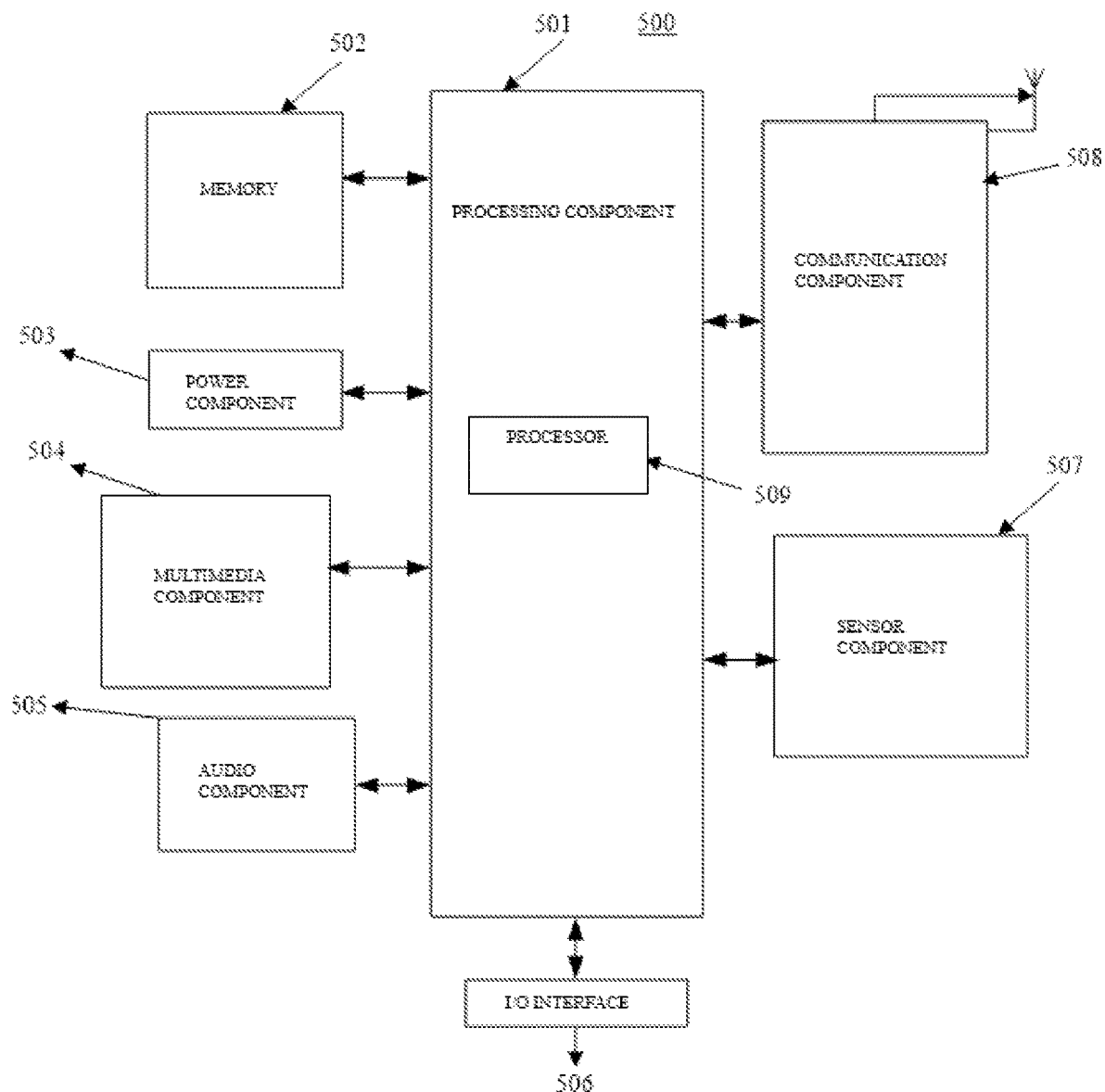
FIG. 18 provides a block diagram of an electronic device according to an exemplary embodiment of the present disclosure.

As shown in FIG. 18, the electronic device 500 can be a terminal equipment or terminal device, such as a computer, a mobile phone, a digital broadcast terminal, a messaging device, a game console, a tablet device, a medical device, a fitness device, a personal digital assistant, etc.

Referring to FIG. 18, the electronic device 500 can comprise one or more of the following components: a processing component 501, a memory 502, a power component 503, a multimedia component 504, an audio component 505, an input/output (I/O) interface 506, a sensor component 507, and communication component 508.

Processing component 501 is typically used to control the overall operation of electronic device 500, such as operations associated with display, telephone calls, data communications, camera operations, and recording operations. Processing component 501 can include one or more processors 509 to execute instructions to perform all or part of the steps of the method described above. In addition, processing component 501 can include one or more modules to facilitate interaction between component 501 and other components. For example, processing component 501 can include a multimedia module to facilitate interaction between multimedia component 504 and processing component 501.

Memory 502 is configured to store various types of data to support operations on electronic device 500. Examples of such data include instructions for any application or method operating on electronic device 500, contact data, phone book data, messages, pictures, videos, etc. Memory 502 can be implemented by any type of volatile or non-volatile storage device, or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disks or optical disks.

Power component 503 provides power to various components of electronic device 500. Power component 503 can include a power management system, one or more power sources, and other components associated with generating, managing, and distributing power for electronic device 500.

The multimedia component 504 includes a screen that provides an output interface between electronic device 500 and a user. The screen includes a touch panel (TP), which is implemented as a touch screen to receive input signals from the user. The touch panel includes one or more touch sensors to sense touches, swipes, and gestures on the touch panel. The touch sensor can not only sense the boundaries of the touch or swipe action, but can also detect the duration and pressure associated with the touch or slide operation. In some embodiments, the multimedia component 504 includes a front camera and/or a rear camera. When the electronic device 500 is in an operation mode, such as a shooting mode or a video mode, the front camera and/or the rear camera can receive external multimedia data. Each front and rear camera can be a fixed optical lens system or have focal length and optical zoom capabilities.

The audio component 505 is configured to output and/or input an audio signal. For example, the audio component 505 includes a microphone (MIC) that is configured to receive an external audio signal when the electronic device 500 is in an operational mode, such as a call mode, a recording mode, and a voice recognition mode. The received audio signal may be further stored in memory 502 or transmitted via communication component 508. In some embodiments, the audio component 505 also includes a speaker for outputting an audio signal.

The I/O interface 506 provides an interface between the processing component 501 and a peripheral interface module, which may be a keyboard, a click wheel, a button, etc. These buttons may include but not limited to, a home button, a volume button, a start button, and a lock button.

Sensor component 507 includes one or more sensors, which are designed to provide status assessment of all aspects to electronic device 500. For example, the sensor component 507 can detect On/Off state of the electronic device 500, a relative positioning of components in the electronic device 500, such as a display and a keypad of the electronic device 500, and the sensor component 507 can also detect the location changes of the electronic device 500 or a component in the electronic device 500, whether there is a contact between a user and the electronic device 500, the orientation or acceleration/deceleration of electronic device 500, or the temperature changes of electronic device 500. Sensor component 507 can include a proximity sensor, which is configured to detect the presence of nearby objects without any physical contact. Sensor component 507 may also include an optical sensor, such as a CMOS or CCD image sensor, to be used in imaging applications. In some embodiments, the sensor component 507 can also include an acceleration sensor, a gyro sensor, a magnetic sensor, a pressure sensor, a temperature sensor, a photoelectric sensor or a GPS sensor.

Communication component 508 is configured to facilitate wired or wireless communication between electronic device 500 and other devices. The electronic device 500 can access a wireless network based on a communication standard, such as WiFi, 2G, 3G or 4G, or a combination thereof. In an exemplary embodiment, communication component 508 receives broadcast signals or broadcast associated information from an external broadcast management system via a broadcast channel. In an exemplary embodiment, the communication component 508 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, or other technologies.

In an exemplary embodiment, electronic device 500 may include one or more application specific integrated circuits (ASICs), digital signal processors (DSPs), digital signal processing devices (DSPDs), programmable logic devices (PLDs), field programmable A gate array (FPGA), controller, microcontroller, microprocessor, or other electronic component for performing the above methods.

The implementation process of the function and the role of each unit in the above device is specifically described in the implementation process of the corresponding steps in the aforementioned method, and details are not to be described herein again.

For the device embodiment, since it basically corresponds to the method embodiment, refer to the description in the method embodiment for anything related. The device embodiments described above are merely illustrative, wherein the units described as separate components may or may not be physically separated, and the components displayed as units may or may not be physical units, i.e. may located in the same place, or distributed to multiple network units. Some or all of the modules may be selected according to actual needs to achieve the objectives of the present disclosure. Ordinary technicians in the field can understand and implement without any creative effort.

Corresponding to the embodiment of the icon wake method mentioned above, the present disclosure further provides a non-transitory computer readable storage medium storing thereon a computer program that causes the processor 509 of the electronic device to implement the icon wake method, including the steps of:

upon detection of a first wake event while the display screen is in the Screen-Off mode, determining whether the second wake event is detected within a preset time threshold, wherein the display screen is equipped with an under-screen fingerprint recognition circuitry in a fingerprint recognition area;

when the second wake event is detected within the time threshold, causing the display screen to switch to a Screen-On mode in which the preset icon is displayed in the fingerprint recognition area;

when the second wake event is not detected within the time threshold, causing the display screen to switch to an Always on Display mode in which the preset icon is displayed in the fingerprint recognition area.

The present disclosure may take the form of a computer program product embodied on one or more storage media (including but not limited to disk storage, CD-ROM, optical storage, etc.) in which program code is embodied. Computer available storage media includes both permanent and non-persistent, mobile and non-mobile media, and information storage can be implemented by any method or technology. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory. (ROM), electrically erasable programmable read only memory (EEPROM), flash memory or other memory technology, compact disk read only memory (CD-ROM), digital versatile disk (DVD) or other optical storage, Magnetic tape cartridges, magnetic tape storage or other magnetic storage devices or any other non-transportable media, which can be used to store information that can be accessed by a computing device.

The method may further comprise: unlocking said display screen when a fingerprint is recognized as a pre-stored security fingerprint by said screen fingerprint recognition circuitry.

The preset icon may include a fingerprint icon.

In the case where the preset icon further includes an application icon, causing said display screen to switch into said Screen-On mode in which the preset icon is displayed in the fingerprint recognition area may comprise: causing said display screen to switch into a Screen-On mode in which said fingerprint icon and said application icon are displayed in the fingerprint recognition area, or causing said display screen to switch into a Screen-On mode in which the said fingerprint icon is displayed in the fingerprint recognition area, and said application icon is displayed outside the fingerprint recognition area.

The method may further comprise: obtaining a fingerprint at the fingerprint recognition area when said application icon is selected; unlocking said display screen and switching into an application interface corresponding to the selected application icon when the fingerprint at the fingerprint recognition area is recognized as a pre-stored security fingerprint by said screen fingerprint recognition circuitry.

In the case where the preset icon further includes an application icon, causing said display screen to switch into said Always on Display mode in which the preset icon is displayed in the fingerprint recognition area may comprise: causing said display screen to switch into an Always on Display mode in which said fingerprint icon and said application icon are displayed in the fingerprint recognition area, or causing said display screen to switch into an Always on Display mode in which said fingerprint icon is displayed in the fingerprint recognition area, and said application icon is displayed outside the fingerprint recognition area.

The preset icon may include a preset application icon.

The method may further comprise unlocking said display screen and switching into an application interface corresponding to said preset application icon when a fingerprint at said fingerprint recognition area is recognized as a pre-stored security fingerprint by said under-screen fingerprint recognition circuitry.

The method may further comprise outputting a selection prompt message when said preset application icon is not selected.

The selection prompt message may be used to prompt a user to perform a selection operation of the preset application icon, and may include at least one of the following messages: a text prompt message, a voice prompt message, and a vibration prompt message.

The first wake event or the second wake event may include a touch wake event, a voice wake vent, a location wake event and a face wake event.

The touch wake event may include a click event and a gesture wake event.

In the Screen-On mode, the display screen may further display at least one of the following information: screen background, current time, current date, a signal bar and an information bar.

In the Always on Display mode, the display screen may only display said preset icon.

Therefore, by switching the Screen-Off mode to the Screen-On display mode or Always on Display mode (AOD mode) in which a preset icon is displayed according to the detected condition of the first wake event and the second wake event in the Off-Screen mode, the present disclosure enables the quick wake of preset icons in the Screen-Off mode, and facilitates users to perform corresponding operations through icons; and it also facilitates users to select Screen-On display mode that brightens all the pixels of the screen or the Always on Display mode that brightens part of the pixels according to current demands. In the related art, the AOD mode is used all the time to replace the Off-Screen mode during the period when the device is not in use, resulting in the occurrence of the burn-in phenomenon caused by displaying the fingerprint icon at a fixed position. This problem is avoided in the present disclosure. It is beneficial to prolonging the service life of the related hardware; and there is no need to keep AOD mode all the time, which will reduce energy consumption.

Since both the electronic device and the non-transitory computer readable storage medium of the present disclosure cover the icon wake method in the present disclosure, both the electronic device and the non-transitory computer readable storage medium of the present disclosure provide the beneficial technical effects produced by the aforementioned icon wake method, and will not repeat here.

A person having ordinary skill in the art may come up with other implementations after considering the specification and implementing the content in the present disclosure. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiment are to be considered as illustrative only. The true scope and main idea of the disclosure is pointed out by the following claims.

It is to be understood that the present disclosure is not limited to the precise construction described above and shown in the drawings, and various modifications and changes can be made without deviated from the scope thereof. The scope of the disclosure is to be limited only by the appended claims.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broadest general meaning of the terms in which the appended claims are expressed.

What is claimed is:

1. A method for waking up an icon in a terminal device, comprising:
    upon detection of a first wake event while a display screen of said terminal device is in a Screen-Off mode, determining, by said terminal device, whether a second wake event is detected within a preset time threshold, wherein said display screen is equipped with an under-screen fingerprint recognition circuitry in a fingerprint recognition area;
    upon detection of said second wake event within said preset time threshold, causing, by said terminal device, said display screen to switch into a Screen-On mode in which a preset icon is displayed in the fingerprint recognition area; and
    when said second wake event is not detected within said preset time threshold, causing, by said terminal device, said display screen to switch into an Always on Display mode in which said preset icon is displayed in the fingerprint recognition area.

2. The method as claimed in claim 1, further comprising: unlocking said display screen when a fingerprint is recognized as a pre-stored security fingerprint by said screen fingerprint recognition circuitry.

3. The method as claimed in claim 1, wherein said preset icon includes a fingerprint icon.

4. The method as claimed in claim 3, wherein when the preset icon further includes an application icon, causing said display screen to switch into said Screen-On mode in which the preset icon is displayed in the fingerprint recognition area comprises:
    causing said display screen to switch into a Screen-On mode in which said fingerprint icon and said application icon are displayed in the fingerprint recognition area, or
    causing said display screen to switch into a Screen-On mode in which the said fingerprint icon is displayed in the fingerprint recognition area, and said application icon is displayed outside the fingerprint recognition area.

5. The method as claimed in claim 4, further comprising:
    obtaining a fingerprint at the fingerprint recognition area when said application icon is selected;
    unlocking said display screen and switching into an application interface corresponding to the selected application icon when the fingerprint at the fingerprint recognition area is recognized as a pre-stored security fingerprint by said screen fingerprint recognition circuitry.

6. The method as claimed in claim 3, wherein when the preset icon further includes an application icon, causing said display screen to switch into said Always on Display mode in which the preset icon is displayed in the fingerprint recognition area comprises:
    causing said display screen to switch into an Always on Display mode in which said fingerprint icon and said application icon are displayed in the fingerprint recognition area, or
    causing said display screen to switch into an Always on Display mode in which said fingerprint icon is displayed in the fingerprint recognition area, and said application icon is displayed outside the fingerprint recognition area.

7. The method as claimed in claim 6, further comprising:
    obtaining a fingerprint at the fingerprint recognition area when said application icon is selected;
    unlocking said display screen and switching into an application interface corresponding to the selected application icon when the fingerprint at the fingerprint recognition area is recognized as a pre-stored security fingerprint by said screen fingerprint recognition circuitry.

8. The method as claimed in claim 1, wherein said preset icon includes a preset application icon.

9. The method as claimed in claim 8, further comprising:
    unlocking said display screen and switching into an application interface corresponding to said preset application icon when a fingerprint at said fingerprint recognition area is recognized as a pre-stored security fingerprint by said under-screen fingerprint recognition circuitry.

10. The method as claimed in claim 8, further comprising:
    outputting a selection prompt message when said preset application icon is not selected.

11. The method as claimed in claim 10, wherein said selection prompt message is used to prompt a user to perform a selection operation of the preset application icon, and said selection prompt message includes at least one of the following messages: a text prompt message, a voice prompt message, and a vibration prompt message.

12. The method as claimed in claim 6, further comprising:
    outputting a selection prompt message when said application icon is not selected.

13. The method as claimed in claim 12, wherein:
said selection prompt message is used to prompt a user to perform a selection operation of the selectable application icon, and said selection prompt message includes at least one of the following messages: a text prompt message, a voice prompt message, and a vibration prompt message.

14. The method as claimed in claim 1, wherein said first wake event or said second wake event includes a touch wake event, a voice wake vent, a location wake event and a face wake event.

15. The method as claimed in claim 14, wherein said touch wake event includes: a click event and a gesture wake event.

16. The method as claimed in claim 1, wherein in the Screen-On mode, said display screen further displays at least one of the following information: screen background, current time, current date, a signal bar, and an information bar.

17. The method as claimed in claim 1, wherein in the Always on Display mode, said display screen only displays said preset icon.

18. An electronic device, comprising:
a processor;
a storage storing executable instructions for said processor;
a display screen, in which a fingerprint recognition area being equipped with an under-screen fingerprint recognition circuitry;
wherein the processor is configured to:
upon detection of a first wake event while said display screen is in a Screen-Off mode, determine whether a second wake event is detected within a preset time threshold;
upon detection of said second wake event within said preset time threshold, cause said display screen to switch to a Screen-On mode in which a preset icon is displayed in the fingerprint recognition area;
when said second wake event is not detected within said preset time threshold, cause said display screen to switch to an Always on Display mode in which said preset icon is displayed in the fingerprint recognition area;
wherein said under-screen fingerprint recognition circuitry is configured to:
perform fingerprint recognition in the Screen-On mode or Always on Display mode.

19. A non-transitory computer-readable storage medium storing instructions causing a processor to execute acts comprising:
determining, upon detection of a first wake event while a display screen of a terminal device is in a Screen-Off mode, whether a second wake event is detected within a preset time threshold;
causing said display screen to switch to a Screen-On mode in which a preset icon is displayed in a fingerprint recognition area of the display screen, upon detection of said second wake event within said preset time threshold; and
causing said display screen to switch to an Always on Display mode in which said preset icon is displayed in the fingerprint recognition area, when said second wake event is not detected within said preset time threshold.

20. The non-transitory computer-readable storage medium as claimed in claim 19, wherein the acts further comprise:
obtaining a fingerprint at the fingerprint recognition area when an application icon in said preset icon is selected;
unlocking said display screen and switching into an application interface corresponding to the selected application icon when the fingerprint at the fingerprint recognition area is recognized as a pre-stored security fingerprint by said screen fingerprint recognition circuitry.

* * * * *